(12) United States Patent
Richarte et al.

(10) Patent No.: US 12,068,763 B2
(45) Date of Patent: Aug. 20, 2024

(54) SOFTWARE-DEFINED COMMUNICATION SYSTEM AND DEVICE

(71) Applicant: Urugus S.A., Montevideo (UY)

(72) Inventors: Gerardo Gabriel Richarte, Caba (AR); David Vilaseca, Caba (AR)

(73) Assignee: Urugus S.A., Montevideo (UY)

( * ) Notice: Subject to any disclaimer, the term of this patent is extended or adjusted under 35 U.S.C. 154(b) by 0 days.

(21) Appl. No.: 17/592,758

(22) Filed: Feb. 4, 2022

(65) Prior Publication Data
US 2022/0247431 A1 Aug. 4, 2022

Related U.S. Application Data

(60) Provisional application No. 63/145,829, filed on Feb. 4, 2021.

(51) Int. Cl.
H04B 1/00 (2006.01)

(52) U.S. Cl.
CPC ........... H04B 1/001 (2013.01); H04B 1/0014 (2013.01); H04B 1/0025 (2013.01)

(58) Field of Classification Search
CPC .............................. H04B 1/001; H04B 1/0014
See application file for complete search history.

(56) References Cited

U.S. PATENT DOCUMENTS

| | | | | |
|---|---|---|---|---|
| 7,545,321 B2* | 6/2009 | Kawasaki | ............. | H01Q 3/267 342/368 |
| 8,878,719 B2* | 11/2014 | Nakabayashi | ....... | G01S 7/4008 342/174 |
| 10,707,974 B1* | 7/2020 | Ho | ......... | H04W 72/29 |
| 2004/0032365 A1* | 2/2004 | Gottl | ...... | H01Q 3/267 342/368 |
| 2006/0019712 A1* | 1/2006 | Choi | ...... | H04B 17/21 455/562.1 |
| 2006/0279459 A1* | 12/2006 | Akiyama | .............. | H01Q 3/267 455/67.11 |
| 2014/0354507 A1* | 12/2014 | Maca | ...... | H01Q 3/26 343/853 |
| 2016/0202344 A1* | 7/2016 | Sanderovich | ......... | H04W 64/00 455/456.1 |

(Continued)

OTHER PUBLICATIONS

Exetended European Search Report mailed on Jul. 4, 2022, for Euroepan Paten Application No. 22153450.6, a foreign counterpart of the U.S. Appl. No. 17/592,758, 14 pages.

Primary Examiner — Jaison Joseph
(74) Attorney, Agent, or Firm — Lee & Hayes, P.C.

(57) ABSTRACT

Systems, methods and devices to generate tailored antenna radiation patterns for particular purposes are provided. The software-defined communication devices and systems dynamically reconfigure an antenna in a controlled and reversible manner, transmit and receive signals to a plurality of endpoints simultaneously without requiring moving elements, and control radiation patterns, making them useful and more versatile for many applications, especially in implementations concerning satellite communications. Communication links may be established with multiple endpoints simultaneously, and the position of the endpoints may be learned without knowing it in advance. The configurations described in the embodiments provide great versatility due to the possibility of processing the signal at each antenna element of the antenna.

22 Claims, 7 Drawing Sheets

(56) References Cited

U.S. PATENT DOCUMENTS

| | | | |
|---|---|---|---|
| 2017/0093745 A1* | 3/2017 | Yonge, III et al. | H04L 47/726 |
| 2017/0104268 A1 | 4/2017 | Ford et al. | |
| 2018/0366815 A1 | 12/2018 | Rheinfelder et al. | |
| 2019/0140349 A1 | 5/2019 | Fikes et al. | |
| 2019/0178983 A1* | 6/2019 | Lin | G01S 7/4021 |
| 2020/0212975 A1* | 7/2020 | Jelonnek | H03F 1/3241 |
| 2021/0067223 A1* | 3/2021 | Uchida | H04L 5/0048 |
| 2021/0344111 A1* | 11/2021 | Kihira | H04B 17/12 |
| 2021/0400513 A1* | 12/2021 | Raghavan | H04B 17/12 |
| 2022/0247431 A1* | 8/2022 | Richarte | H04B 1/0025 |
| 2023/0031668 A1* | 2/2023 | Aoki | H01Q 3/267 |

\* cited by examiner

SOFTWARE-DEFINED COMMUNICATION SYSTEM AND DEVICE

RELATED APPLICATIONS

The present application claims priority to U.S. Provisional Application No. 63/145,829, filed on Feb. 4, 2021, and entitled "SOFTWARE-DEFINED COMMUNICATION SYSTEM AND DEVICE", the entire contents of which are incorporated herein in its entirety by reference.

BACKGROUND

The efficient transmission and reception of electromagnetic signals imposes several challenges when multiple signals, transmitters or receivers, are involved. Even though several techniques have been developed to handle some of these situations, some are inadequate or inefficient for implementation in wireless systems. Radio frequency communication is a type of wireless communication which uses antennas usually designed to transmit and receive radio waves in all directions equally (omnidirectional), or preferentially in a particular direction (directional or high-gain antennas). However, conventional antennas used in wireless communication usually lack versatility when there is a need to establish remote communications with multiple receivers or when there is a need to locate a receiver by searching a determined geographical region. These problems become exacerbated if the wireless communication device is on-board a vehicle with limited space or mobility, or quite the opposite, when the device is on-board a vehicle which may move freely but these movements would represent a huge consumption of power resources. Steerable antennas are of high interest, since these can shift the direction of the main lobe. In some cases, this shift may be achieved by using reflection by large metal surfaces which move to change the direction of the radio waves, or by physically mounting the antenna on a large rotating mechanism. However, antennas with moving parts are undesirable due to, for example the elevated maintenance costs, and in satellite applications, due to the unwanted movements which require additional power and components to be compensated and generate attitude disturbances on the satellite control system. Electronically steerable antennas present an advantageous alternative which also raises new challenges for achieving useful and efficient implementations.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
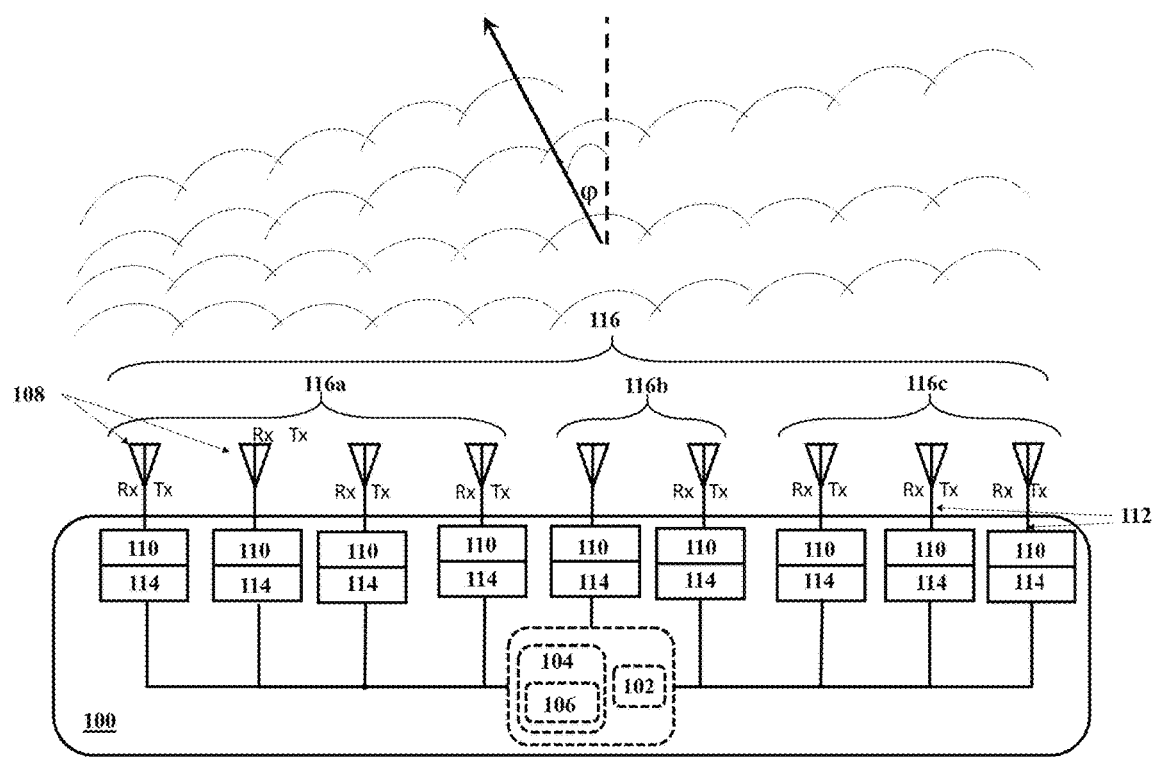
FIG. 1 shows an example of a software-defined antenna.

Embodiments include novel systems, processes and devices for implementing electronically steerable antennas (a type of software-defined communication systems) to reconfigure, control and generate beams in a dynamic and reversible manner, making it useful and more versatile for many applications. The systems, methods and devices are further designed or configured to handle the communication with multiple endpoints, in some instances sequentially or simultaneously, generally without requiring moving elements, and establishing communication links with one or more endpoints with or without knowing its location in advance.

Embodiments include a software-defined communication system for transmitting and/or receiving electromagnetic signals, such as radiofrequency (RF) signals, the system comprising a plurality of antenna elements, a plurality of analog signal processing units (ASPUs) configured to connect via antenna channels to the plurality of antenna elements, and a plurality of digital signal processing units (DSPUs) configured to connect to at least one of the plurality of ASPUs and/or to one or more DSPUs of the plurality of DSPUs. Those skilled in the art will recognize that signals as used herein, refer to electromagnetic waves used to transport information (encoded data streams) e.g. voice, data, image, signal or video information, wirelessly from one point to another. Further, the term beam as used herein refers to waveform signals encoding data/data streams transmitted/received by the antenna elements which determine the antenna's radiation pattern.

The ASPU comprises hardware configured to process analog signals transmitted and/or received by the plurality of antenna elements, and the DSPU comprises a processor, a memory and programming instructions stored on the memory and executable by the processor to perform acts including applying digital signal processing techniques to the signals transmitted and/or received by the plurality of antenna elements. The antenna elements are configured to at least one of transmit or receive signals, generally encoding data streams. Some or all the antenna elements of the system may conform one or more antenna beams in the same frequency as a result of the interactions amongst the antenna elements. Additionally, the same antenna element may handle one or more antenna beams at different frequencies. Each of the plurality of antenna elements may be any element which transmits an electromagnetic wave as a function of the electrical current present on the surface of the elements and/or receives an electromagnetic wave as a function of the electric field present within an aperture, elements which are well known to those of ordinary skill in the art.

The DSPUs are configured to apply digital signal processing techniques including applying at least one of phase shifts, amplitude shifts or time delays of selective magnitudes to the digital signals transmitted and/or received by the plurality of antenna elements and pre-processed by the ASPUs, to beamform the signals to produce one or more beams associated with respective directions of propagation. Rather than implementing the beamforming control of the antenna elements by introducing shifts and delays to the analog signals at the ASPUs connected to the antenna elements, the signals from each antenna element may be independently processed at the one or more DSPUs so that the digital beamforming is performed at the one or more DSPUs. The analog signals that are processed by the ASPUs and the digital signals that are processed by the DSPUs include electromagnetic signals ranging from baseband signals to RF signals. In some instances, at least one of phase shifts, amplitude shifts or time delays of selective magnitudes are applied to baseband signals encoding data streams.

By operating in this manner, the DSPUs are configured to apply shifts or delays to the digital signals to perform digital beamforming techniques to provide different beams, according to particular purposes or applications. The DSPUs may digitally adjust the relative phases or time delays of transmitted and/or received signals by the antenna elements, and generally processed by the APSUs, to provide tailored antenna beams by reinforcing the intensity of the signals in desired directions and at the same time suppressing it in undesired directions, to define antenna beams comprising particular configurations of main and side lobes. For example, a spacecraft using a software-defined communication system may search for and locate one or more endpoints within a predetermined geographical region. The DSPUs of the software-defined communication system may apply the necessary phase shifts or time delays to the digital signals, required to steer the antenna beams throughout the extent of the region in order to measure the input power of incoming antenna beams and determine the direction of arrival (DOA) of the endpoint(s). As used herein, the term endpoint refers to a RF receiver, RF transmitter, or RF transceivers in a fixed or mobile platform, such as a satellite, a radio station, a cell phone, a watercraft, an aircraft, a ground-based station, or any device capable of transmitting and/or receiving RF signals or establishing radiowave communications.

Embodiments may apply further digital signal processing techniques including, but not limited to, at least one of data or channel encoding/decoding, multiplexing/demultiplexing, compression/decompression, encryption/decryption, sampling, detection, frequency spreading/despreading, filtering, amplification, up/down conversion, demodulation/modulation, phase shifting, time delaying, equalization, distortion compensation, and so forth.

The software-defined communication system described herein provides a novel architecture by connecting each antenna element to an ASPU, and each ASPU to at least one of the plurality of DSPUs, in order to apply signal processing techniques to the transmitted and/or received signals. Additionally, the DSPUs may be also interconnected. The plurality of digital signal processing units, (DSPUs) may be connected to at least one of the plurality of ASPUs and/or to one or more of the plurality of DSPUs. Considerable advantages can be realized by applying digital signal processing techniques to the digital signals at the DSPUs since this significantly distributes the processing capabilities of the system among all the DSPUs. The DSPUs may be further designed or configured to dynamically reconfigure the waveform signals transmitted and/or received by the antenna elements by digitally processing the electromagnetic signals and feeding the antenna elements. This dynamic reconfiguration may control the direction, shape and number of beams to tailor the beams for particular purposes or needs. For example, at least one of the plurality of DSPUs may be configured to apply at least one of phase shifts, amplitude shifts, distortion compensation, or time delays to the digital signals, to adjust at least one of the gain, power, coverage angle, coverage distance or intensity of the beams, and to detect or synthesize signal polarization. This capability is convenient, for example, for communicating with multiple endpoints simultaneously. In some instances, a DSPU connected to at least one of a plurality of ASPUs may be further connected to some or all of the additional DSPUs included in the software-defined communication system. The DSPUs may be connected in such a way as to form a connection diagram or architecture that allows for intermediate digital processing and combination of digital signals, allowing more precise and faster signal processing while reducing the total incoming or outgoing bandwidth handled by other processors. The connection layout between DSPUs may present different configurations, as described in more detail elsewhere within this Detailed Description.

Embodiments may also include a central processor (CP) configured to perform some or all of the control functions associated with processing the signals transmitted and/or received by the plurality of antenna elements. The CP may be further configured to apply signal processing techniques to the signals pre-processed by one or more DSPUs. In some instances, the CP may be introduced to centralize the signal processing, but in other instances the DSPUs may have the capability of and may also apply processing techniques (same or different than the ones applied by the CP) in order to distribute the processing of the signals throughout the system. The central processor (CP) may be connected to some or all the DSPUs of the software-defined communication system.

The CP may be configured to generate waveform signals to be transmitted by the antenna elements. The signals may encode the same data so that one or multiple endpoints receive the same data, or may encode different data streams to transmit different data streams (messages) to a single or multiple number of endpoints. Additionally or alternatively, the CP may be configured to transmit the data streams to be encoded to the DSPUs, and then each DSPUs may be configured to generate the signal parameters by applying the proper signal transformations to generate waveform signals to be transmitted by the antenna elements. This configuration requires lower bandwidth between the CP and the DSPUs.

The CP may be configured to apply processing techniques to digital signals similar to the processing techniques applied by the DSPU, but with the possibility of processing the signals of one, some or all of the plurality of antenna elements after being processed (pre- or post-processed) by the DSPUs. The CP and/or DSPUs may be configured to apply processing techniques implemented by software to the signals, including filtering, amplification, up/down conversion, demodulation/modulation, equalization, distortion compensation, and/or signal polarization detection. For example, either the CP and/or the DSPUs may be configured to apply at least one of phase shifts, amplitude shifts or time delays to the signals and/or adjust at least one of the gain, power, coverage angle, coverage distance or intensity of the antenna beams.

Even though the CP and DSPUs may be capable of applying the same or similar processing techniques, the net computing demand to the CP may be reduced or minimized since the computing effort may be distributed by processing signals at the DSPUs before or after being processed by the CP, generally independently, providing more versatility and robustness to the system. For example, in reception mode the ASPUs may amplify, filter and down convert the signals received by the antenna elements connected to them, and the DSPU may subsequently convert the analog signals to digital signals and process the digital signals by applying distortion compensations, equalization, and further down conversion, to subsequently transmit the pre-processed digital signals to the CP. The CP may receive all the pre-processed digital signals from the DSPUs and may apply further processing techniques. In transmission mode, the CP may generate different digital signals and feed each DSPU connected to it. Each DSPU may further post-process the digital signals from the CP, for example by introducing a predetermined phase shift or distortion compensation by means of programming instructions, so that all DSPUs transmit the generated signals to one or more endpoints. The possibility of pre-processing and post-processing the signals by the DSPUs instead of centralizing the processing operations in a single processor provides a relevant advantage since it allows the distribution of computational efforts throughout the system and increases the computational resources required to perform digital signal processing techniques.

The CP may be also configured to execute various instructions, routines and operations to control the DSPUs connected to it. The DSPUs like the CP may be further configured to perform control functions associated with the processing of the signals transmitted and/or received by the antenna elements, may control the programming instructions, the hardware, and/or the distribution of processing tasks throughout the system. The CP and/or the DSPU may also be configured to implement synchronization mechanisms, for example synchronization signals distributed throughout the system such as clock signals that may be sequentially shared by the DSPUs of the system.

Digital signals encoding data streams may be generated and/or digitally processed by any of the CP or the DSPUs. In some instances, the CP may be configured to generate and apply digital processing techniques to one or more signals for feeding the antenna elements with signal(s) having predefined signal parameters (e.g. gain, phase, frequency, polarization). In other instances, the CP may be configured to generate one or more digital signals having predefined signal parameters and the DSPUs distributed throughout the software-defined communication system may be configured to apply digital processing techniques to the one or more signals for feeding the antenna elements in order to transmit the signal(s) through the antenna elements. Likewise, any of the CP or the DSPUs, either alone or in combination, may be configured to apply digital signal processing techniques after the signals are received by the antenna elements and processed by the ASPUs. In some instances, the signal parameters may be defined according to communication parameters determined for example by an external processor or user. For example, an earth observation satellite including a payload, which in many cases will include an imaging system designed to capture imaging data, may need to establish a communication channel with one or more endpoints, such as ground stations, space stations or other satellites, to exchange (transmit/receive) instructions or data with them. The satellite may also include an antenna or radio communication system, such as the software-defined communication system as part of its communication module to establish communications with the endpoints. In some instances, the satellite's control system may provide to the software-defined antenna (i.e. software-defined communication system) the positions of several endpoints located over a determined geographical region or defined space, as well as the data to be encoded and transmitted to the endpoints. The CP may determine the proper signal parameters such as gains, modulation, phase shifts, amplitude shifts and/or time delays and may provide the data to be encoded and the signal parameters to the DSPUs so that the DSPUs apply the signal parameters to the data to create one or more directive beams by using destructive and constructive interference in order to transmit the signals with the encoded data either simultaneously or sequentially to multiple endpoints.

The CP may be configured to define at least one of a phase shift, an amplitude shift or a time delay to be applied to the signals transmitted and/or received at each antenna element according to the relative position of the antenna elements in the software-defined communication system, and configure the DSPU to digitally apply the predefined shift or delay to the digital signals. The digital signals having the shifts or delays defined by the CP and applied by the DSPUs are converted to analog signals and are fed to each antenna element connected to the DSPU through the ASPU. In some instances, the DSPU may be configured to autonomously choose optimal signal parameters (phase shift, etc) without intervention of the CP, so that the DSPU may be configured to define at least one of a phase shift, an amplitude shift or a time delay, apply it to the digital signals, and feed the antenna element connected to the DSPU through the ASPU with analog signals.

The CP may be further configured to select groups of DSPUs, for example to provide different emphasis, equalization, time or phase shifts to the signals of each group, in order to independently control the signal parameters of different groups of antenna elements in the system. Either the CP or the DSPU may apply at least one of phase shifts, amplitude shifts, time delays, gain, power, or other signal parameters' processing, to the antenna groups, for example to steer the beam in different directions and/or to compensate for signal distortions.

The software-defined communication system may operate in transmission mode, reception mode, as a radar for example to estimate the location of a signal from an endpoint, to detect the DOA, and also in both transmission and reception modes. Generally, means for switching modes may be implemented in hardware, software, or a combination thereof. In some implementations, for example in transmission mode, the modulation effort could also be distributed through the DSPUs, lowering the required bandwidth that reaches any subsequent processor such as a DSPU or a CP. In other embodiments, for example in reception mode, the demodulation may be distributed through the DSPUs, lowering the required bandwidth that reaches any subsequent processor such as a DSPU or a CP.

Generally, any transmitted or received signal is affected by noise, such as the electronic noise of all the elements of the electronic circuitry comprising the system or the external noise picked up by the circuits. In order to reduce the noise, in some embodiments, the software-defined communication system, may be further configured to apply techniques to enhance the signal-to-noise ratio (SNR), for example by averaging the transmitted or received signals so that the noise decreases with the square root of the number of averaged samples, either at the CP and/or DSPUs.

In some embodiments, the software-defined communication system may further comprise a supporting structure to mechanically mount the antenna elements and/or to provide electrical connections. The antenna elements may be arbitrarily distributed over a bidimensional surface or a three-dimensional space, with or without following a regular or apparent pattern. In some implementations, the antenna elements may be arranged forming a pattern in which the separation between antenna elements may be physically determined during its assembly, or may be determined electronically by using the software-defined communication system. For example, the antenna elements may be distributed over the roof of a building or on the tiles of a house without physically determining the precise separation between antenna elements while the antenna of the software-defined communication system is being assembled. In these situations, the software-defined communication system may further include methods to determine the relative position between antenna elements, for example by using auto-calibration methods or by using sub-lambda knowledge through sampling using a predefined/characterized electromagnetic signal, as described in more detail elsewhere within this Detailed Description.

In some implementations, the antenna elements may be arranged in a N-dimensional array wherein N≤3, such as a linear, bidimensional or three-dimensional array, and the array may be mounted directly on a surface of a physical structure, or a terrestrial, maritimal or aerial vehicle, for example on a building, a drone, a satellite, a ship or a car. The antenna array may also be a deployable structure that may be extended and stowed. In some instances, the antenna elements are provided as part of a phased array antenna on a moving platform including any manned or unmanned aerial, maritime or terrestrial moving platform, such as a car, a spacecraft, a satellite, a drone or a ship, usually as part of a communication system. The total size of the phased array antenna may include a single antenna array or a plurality of antenna arrays arranged in a predetermined pattern, or without following a regular or apparent pattern, to provide a scalable and modular architecture for construction of variable steerable antenna sizes, ranging from small to large-scale antennas. In some implementations, the DSPUs may be also configured to electronically establish antenna element subarrays, wherein the subarrays may be determined for example by programming instructions defining subsets of antenna elements, and/or by physically coupling/connecting together a predetermined number of DSPUs forming one or more subsets of DSPUs.

In some embodiments, part or all the components of the software-defined communication system may be manufactured in a traditional rigid or flexible printed circuit board (PCB) in a PCB manufacturing facility. For these applications, the system may further comprise a surface or base to provide mechanical support and electrical interconnection between the constituting elements.

The processes, systems, and devices described herein may be implemented in a number of ways. Example implementations are provided below with reference to the following figures to aid in illustration, although those examples are not meant to be taken in a limiting sense.

Example of Software-Defined Communication System

FIG. 1 is a block diagram of a programmable steerable antenna system 100 (i.e. software-defined communication system) usable to transmit and/or receive signals encoding data between endpoints, providing multiple stages of signal processing and the ability of managing multiple endpoints. The same configuration may be used for both transmission and reception modes. The programmable steerable antenna system 100 may be mounted on-board an aerial, maritime or terrestrial vehicle, such as an aircraft, a spacecraft, a drone, a car, a ship, or a satellite, such as a LEO satellite, or may be on a structure on the ground, such as a building, a house or a ground station. In some embodiments, some of the components of the programmable steerable antenna system 100 may be on a separate ground-based structure or vehicle, with such ground-based structure or vehicle in communication with the system. For example, in some implementations a central processor may be all or partially ground based or on-board an aerial vehicle. The programmable steerable antenna system 100 allows reversible reconfigurations and versatility for a variety of applications since it does not require specialized hardware to implement beamforming techniques or other signal processing or transformations. The described configuration provides the advantageous capability of electronically processing signals at different levels in the circuit.

The programmable steerable antenna system 100 may include one or more processors 102 and computer-readable media 104. The computer-readable media 104 is non-transitory and may store various instructions, routines, operations, and modules that, when executed, cause the processors to perform various activities. In some implementations, the one or more processors 102 are central processing units (CPU) or any other sort of processing unit, such as, for example, digital signal processors (DSPs), field programmable gate arrays (FPGAs), application-specific integrated circuits (ASICs), or others, such as, artificial intelligence and machine learning accelerators. The non-transitory computer-readable media 104 may include volatile and nonvolatile, removable and non-removable tangible, physical media implemented in technology for storage of information, such as computer-readable instructions, data structures, program modules, or other data. System memory, removable storage, and non-removable storage are all examples of non-transitory computer-readable media. Non-transitory computer-readable storage media may include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the system or any computing device.

In some embodiments, non-transitory computer-readable media 104 may further store a control module 106 that may perform some or all of the control functions associated with processing signals in accordance with embodiments of the present disclosure. The control module 106 is executable by the one or more processors 102, to control, such as through one or more input/output interfaces, the processing of the signals. The non-transitory computer-readable media 104 may additionally store programming instructions and program modules that are loadable and executable by the one or more processors 102, as well as information/data generated during execution of, and/or usable in conjunction with these programs, such as image, voice, data, signal or video information, and so forth. In some implementations, the control module 106 may be stored in a non-transitory computer-readable media present in the DSPUs 114 instead of being stored in the central non-transitory computer-readable media 104. Alternatively the control module 106 may be distributed among some or all of the plurality DSPUs 114, including or not the central processor(s) 102. The functions of the control module 106 may be executed but one or more processors present in the DSPUs 114 instead of the central processor(s) 102, so that and the central processor(s) 102, the central computer readable media 104, and the control module 106 may be removed. This optional architecture is illustrated by the broken lines of the boxes representing the one or more processors 102, the central computer readable media 104, and the control module 106. The programmable steerable antenna system 100 may further comprise one or more antenna elements 108 and one or more analog signal processing units (ASPUs) 110 configured to connect via antenna channels 112 to the antenna elements 108. The ASPUs 110 may comprise hardware configured to process analog RF signals transmitted and/or received by the antenna elements 108. The programmable steerable antenna system 100 may further comprise one or more digital signal processing units (DSPUs) 114. The DSPUs 114 may be connected to at least one of the ASPUs 110 and/or to at least one of the DSPUs, and are configured to apply digital signal processing techniques to the signals transmitted and/or received by the antenna elements 108 processed by the ASPUs 110. The programmable steerable antenna system 100 may be configured to transmit/receive signals to and from one or more endpoints, one signal at a time or simultaneously. As used herein, simultaneously means virtually within the same period of time taking into account possible delays due to implementation limitations. The DSPUs 114 and/or the one or more processors 102 may be configured to apply any digital transformation to the electromagnetic signals received or to be transmitted through the antenna elements 108, for example, 1) by digitally controlling the phase offset, amplitude weights or time delay of the signals to apply beamforming techniques for directional signal transmission or reception (e.g. an antenna beam), 2) by applying one or more digital signal transformations (digital signal processing), as described throughout the specification, to adjust the signals according to predefined communication parameters, or 3) by compensating signal distortions to improve the signal bandwidth. Examples of digital signal transformations include, but are not limited to, filtering, amplification, up/down conversion, demodulation, modulation, equalization, emphasis, distortion compensation, time delays, phase shifts, amplitude shifts to the signals, compression/decompression, encryption/decryption, or any other signal processing techniques well known in the art.

In some implementations, the programmable steerable antenna system 100 may be further configured to electronically determine and/or select sub-groups 116a, 116b and 116c of antenna elements 108 in order to receive or transmit signals utilizing the preselected sub-groups, or may be configured to receive or transmit signals utilizing all the antenna elements of the system.

In some instances, the programmable steerable antenna system 100 may be implemented using at least one of Universal Software Radio Peripherals (USRPs), software-defined radios (SDRs), or alternative types known in the art.

Figure 2A:
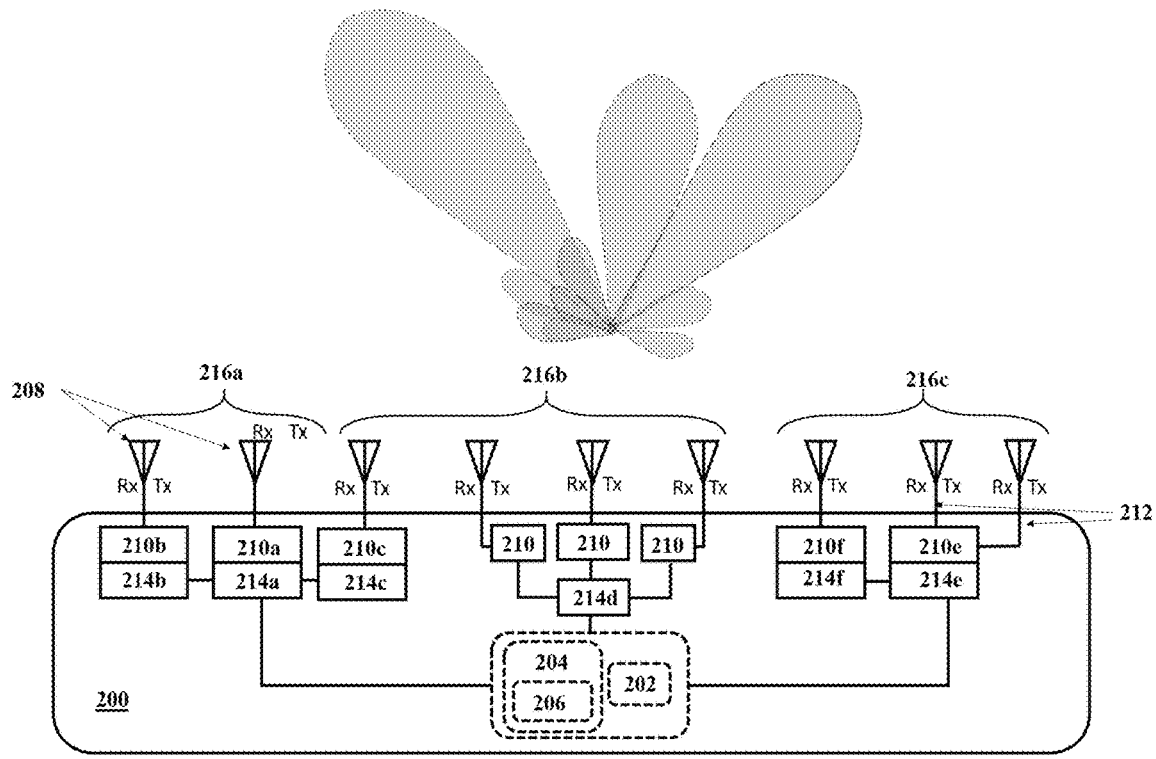
FIGS. 2A and 2B illustrate examples of architectures of software-defined antennas.
Figure 2B:
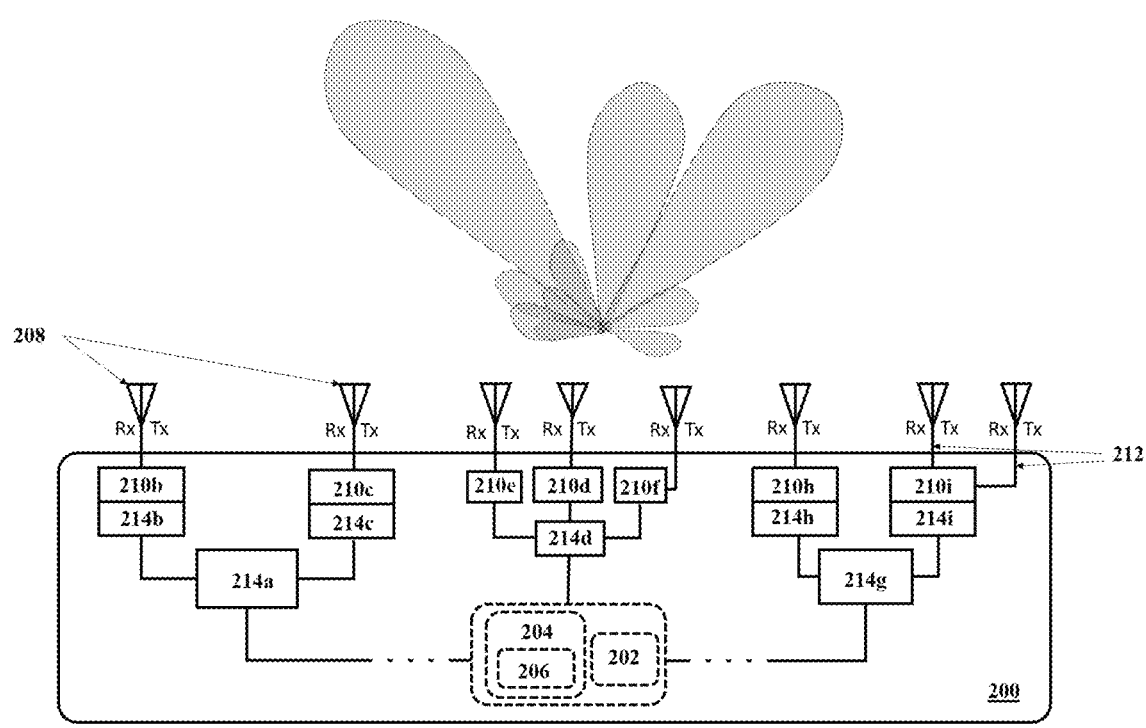

FIGS. 2A and 2B illustrate examples of architectures or arrangements of the plurality of DSPUs and ASPUs comprising the software-defined antenna 200 (i.e. software-defined communication system), providing multiple stages of signal processing and the ability of managing multiple endpoints. One of the main advantages of these architectures is that the same architecture may be used for both transmission and reception modes. It should be understood that these are non-limiting examples and different interconnection designs can be used within the scope of the present disclosure. The DSPUs 214 may be connected to at least one of the ASPUs 210 and/or to at least one of the plurality of DSPUs 214. The DSPUs may have direct or indirect connections between some or all of the DSPUs and with some or all of the ASPUs (and hence the antenna elements) in the system. FIG. 2A shows a non-limiting example of an interconnection design that may be used. The left side of FIG. 2A shows that the DSPU 214a is connected to DSPUs 214b and 214c, and each DSPU 214a, 214b and 214c is further connected to its corresponding ASPU 210a, 210b and 210c. In turn, each ASPU 210a, 210b and 210c is connected to its corresponding antenna element 208. Additionally or alternatively, as shown in the central part of FIG. 2A, the DSPU 214d may be connected to more than one ASPU 210, wherein each ASPU 210 is connected to an antenna element 208. The right side of FIG. 2A shows that the DSPU 214e may be connected to DSPU 214f, and the DSPUs 214e and 214f may be connected to their corresponding ASPUs 210e and 210f. In this example, the ASPUs 210f may be connected to one antenna element 208 whereas the ASPU 210e may be connected to two antenna elements 208. As explained above, any other combinations of connections may be used. FIG. 2B shows another example of architecture wherein DSPU 214a is connected to DSPUs 214b and 214c, and in some instances is connected to the central processor 202. Each DSPUs 214b and 214c is further connected to its corresponding ASPUs 210b and 210c, and the ASPUs 210b and 210c are connected to their respective antenna element 208. The central part of FIG. 2B shows an alternative or additional connection wherein the DSPUs 214d may be connected to the central processor 202 and to the ASPUs 210d, 210e and 210f, each connected through the antenna channels 212 to their corresponding antenna elements 208. The right side of FIG. 2B shows another alternative or additional connection wherein the DSPUs 214g may be connected to the central processor 202 and to the DSPUs 214h and 214i. The ASPUs 210h and 210i, each connected through the antenna channels 212 to their corresponding antenna elements 208 are respectively connected to the DSPUs 214h and 214i.

As described above, in some instances some or all of the DSPUs 214 may be connected to a central processor 202 which may provide controlling instructions to be executed by the processors of the DSPUs 214. Alternatively or additionally, the DSPUs 214 of the antenna 200 may have a common direct or indirect connection to each other in order to generate and share controlling instructions between them without requiring a central processor 202. In addition, the central processor 202 and/or the DSPUs 214 may digitally configure subarrays 216a, 216b and 216c of antenna elements 208, which can be operated independently, increasing the versatility of the antenna, as shown for example in FIG. 2A.

By providing a significant flexibility in the hardware architecture and an adaptable software configuration of the system/device, the software-defined communication systems and devices described herein do not require a specialized hardware for each signal transformation operation it performs, instead the same system or device may apply phase or time delays for beamforming the beams or other type of signal transformation using the same hardware but varying the programming instructions, so that the same architecture may be used for performing a variety of signal processing techniques. These architectures dynamically configured by software also allow to reduce the complexity of the processing operations performed by the system by distributing the processing operations among the components of the system. For example, in transmission or reception mode some or all of DSPUs may be configured to apply digital signal transformations to the electromagnetic signals so that the processing bandwidth required to perform the signal transformations is distributed among the DSPUs instead of being centralized in a single processor. In addition, some or all of DSPUs may process the signals within the range of RF signals to baseband signals, depending on the signal transformation to be applied to the signal. In some beamforming applications, some or all the DSPUs may perform some correlation measurement between the signals from other DSPUs and/or ASPUs to find the optimal time or phase shift to apply to the RF signals or baseband signals to be transmitted/received by the antenna elements, so that the signal to be transmitted/received is the result of combining all the time- or phase-shifted signals of the antenna. In some implementations, the signal to be transmitted/received may be additionally or alternatively processed by the central processing 202, for example by modulating/demodulating the signals.

Figure 3:
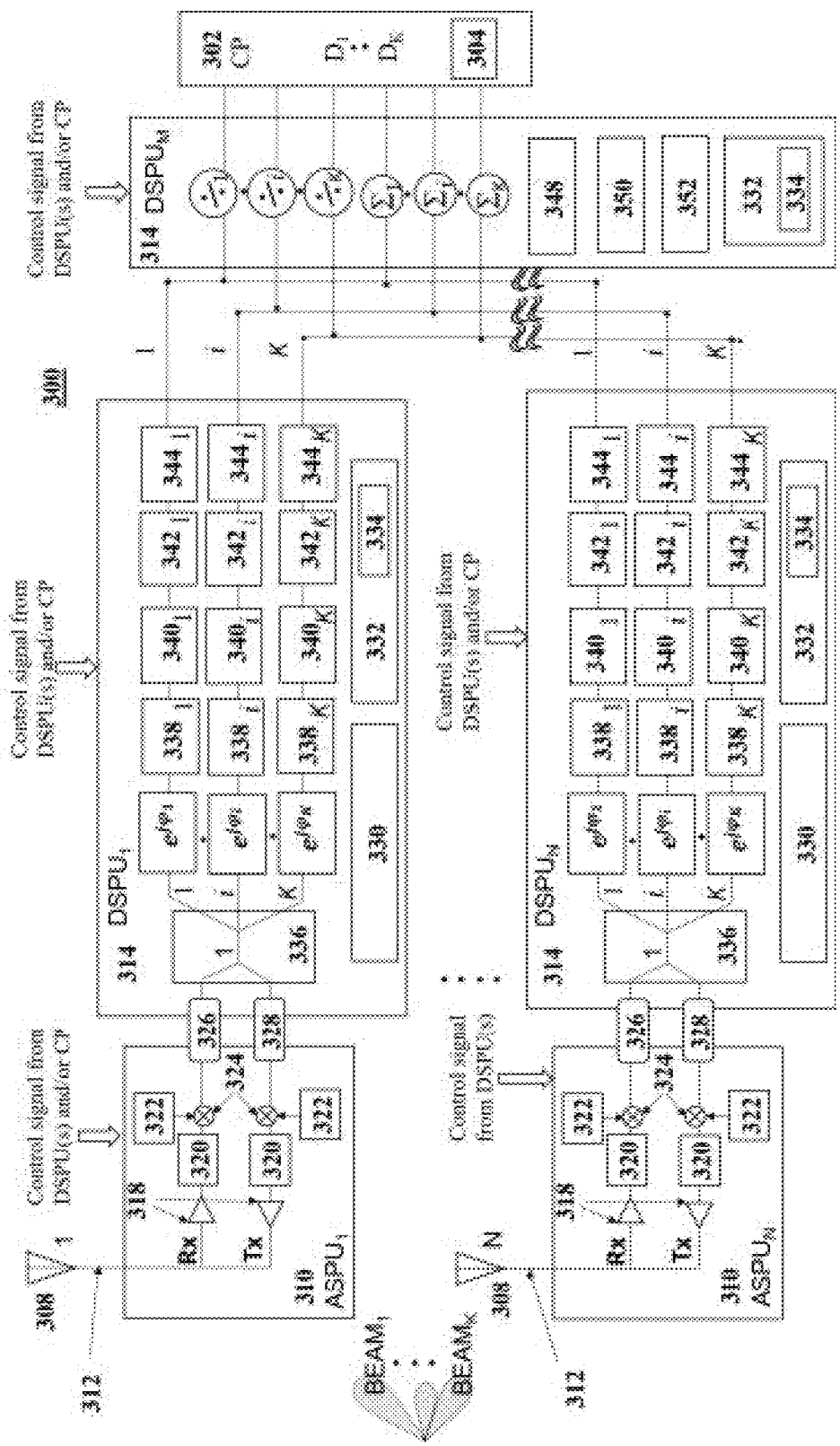
FIG. 3 is a block diagram showing an example of a physical implementation of a software-defined communications system configured to apply beamforming techniques for radiofrequency (RF) signal reception/transmission.

FIG. 3 provides a block diagram that illustrates an example of software-defined communication system 300 (i.e. programmable steerable antenna system) configured to apply analog or digital transformations to electromagnetic signals, including one or more of filtering, amplification, up/down conversion, demodulation, modulation, equalization, distortion, distortion compensation, phase/amplitude shifts, time delays, and beamforming techniques for RF signal reception/transmission. The system 300 is useful for reducing the bandwidth requirements, performing spatial multiplexing, and directional beamforming. The software-defined communication system 300 comprises a plurality of antenna elements 308 configured to receive and/or transmit radio frequency signals from/to one or more endpoints. In some implementations the antenna elements 308 may be arranged as a phased array antenna with N number of elements, each of the N antenna elements 308 configured to receive and/or transmit RF signals from/to one or more endpoints. In some instances, the processors 330 of the DSPUs 314 and/or the central processor 302 may implement programming instructions (computational algorithms) to use the antenna array as a whole, or may select subarrays of antenna elements 308. The antenna elements 308 may be connected to at least one ASPU 310 through an antenna channel 312 and in some example implementations, each antenna element 308 may be connected to one ASPU 310, for example N antenna elements connected to N ASPUs. In some instances, the ASPU 310 may be implemented as an analogue RF frontend module included for example in a software defined radio (SDR). The ASPU 310 may include all analog hardware including, but not limited to filters, amplifiers, mixers, and/or up-down converters. It should be appreciated that not all the hardware needs to be present in all embodiments, that additional hardware may be present for other purposes, and that many hardware may be present for one or more of the purposes described.

In general, the analog signals that reach the antenna elements 308 include weak RF signals with a certain degree of noise. In order to obtain useful information, it is desirable to amplify the signals while minimizing any noise or distortion that might be present. The ASPUs 310 may be further configured to amplify the RF signals while minimizing noise by using an amplifier 318 to increase the power of the signals without significantly degrading its signal-to-noise ratio. For example, when an RF signal is received by the antenna element, a low-noise amplifier (LNA) is coupled to the antenna element to boost the antenna signal to compensate for the feed line losses between the source and the antenna element. Conversely, for signal transmission a high-power amplifier (HPA) may be used. In implementations involving simultaneous transmission and reception modes of operation, the ASPUs 310 may further include a duplexer in order to reduce or diminish any interference that the transmission signal might generate in the reception circuitry, for example if the transmission and reception frequencies are close (e.g. the beat signal is within a predetermined value).

The ASPU 310 may be further configured to filter 320 unwanted noise or predetermined signal components from the RF signals and may further comprise a filter to reduce or eliminate noise and/or predetermined signal components from the signals such as frequency components of the K antenna beams transmitted/received by the antenna elements 308 which are not within the desired band operation. The filters may be bandpass filters, low pass filters, high pass filters, band reject filters, combination of these, or any other type of filters as providing the features and benefits described.

In some instances, the ASPU 310 may comprise one or more local oscillators 322 and one or more mixers 324, operating according to conventional up- and down-converting techniques and properly synchronized by the CP 302 and/or the DSPUs 314, to transpose the signals from a determined frequency to another. For example, N or a subarray of antenna elements 308 may receive RF signals shaping up to K antenna beams. The ASPU 310, after amplifying and/or filtering the RF signals, may transpose the signals from a higher RF frequency into an intermediate or baseband frequency using a downconverter. Likewise, before transmitting up to K antenna beams through the N or the subarray of antenna elements 308, each ASPU 310 may use an upconverter to shift the baseband or intermediate frequency of the RF signals into a higher frequency such as S-Band, X-Band-Ka-Band, Ku-Band, V-Band. In some implementations, the DSPUs 314 may digitally transpose the signals from a determined frequency to another or control these shifts, as described elsewhere within the Detailed Description.

The ASPU 310 and DSPU 314 may be connected through an analog-to-digital converter 326 and digital-to-analog converter 328 and suitable interfaces to establish communications between the modules. In reception mode, the RF signals received by the antenna elements 308 are analog signals which are converted into digital signals to be processed by the DSPUs 314. Correspondingly, in transmission mode, the digital signals are converted into analog signals by the ASPUs 310 to be transmitted by the antenna elements 308 to one or more endpoints. In some implementations, there are N antenna elements 308, N or a lower number of ASPUs 310, and M number of DSPUs 314, wherein M may be lower, equal or greater than the number N.

The DSPU 314 may include one or more processors 330. The processors 330 may be the same as the processors 302 of the programmable steerable antenna system, but in many instances are processors 330 dedicated to the DSPU 314. The processors 330 may be GPUs, DSPs, FPGAs, ASICs, AI accelerators or any combination of these, or alternative types of suitable processors. The DSPU 314 may further include computer-readable media 332 that stores one or more modules for controlling the ASPU 310 hardware, for controlling the DSPUs 314, and for processing the signals transmitted/received by the antenna elements 308. The computer-readable media 332 may be the same as the computer-readable media 304 of the programmable steerable antenna system, but in many instances are non-transitory computer-readable media 332 dedicated to the DSPUs 314. The non-transitory computer-readable media 332 may further store firmware 334 such as bitfile to perform or otherwise control various functions of the DSPU 314. The firmware 334 may be executable by the one or more processors 330, to control some or all functions of the ASPUs 310 and/or the DSPUs 314, to process signals and/or encoded data, to store encoded data on the non-transitory computer-readable media 332, and so forth. In embodiments, some or all of the functions of the modules and/or other functions of the firmware 334 may be implemented as logic functions on the one or more processors 330. For example, in some embodiments, the one or more processors 330 may include an application-specific integrated circuit (ASIC), digital signal processors (DSPs), graphics processing units (GPUs), tensor processing units (TPUs), a programmable logic device, such as field programmable gate arrays (FPGAs) where the firmware 334 is executed, or other logic circuit where the firmware 334, bitfile or other programming instructions/descriptions are executed to perform various functions, including various control and processing functions. Other examples of processors or components may be used with embodiments described herein and are contemplated herein as providing the features and benefits described. In addition, some or all of the processors 330 of the DSPUs 314, the central processor 302 or both, may control or configure some or all components of the ASPU 310 by providing programming instructions to control or configure for example, the oscillator's frequency, the amplifiers gain, the filters' parameters, the selection of a predetermined number of antenna elements when there's more than one, the selection of reception and/or transmission lines, phase shifts, as well as any other configuration related to the components of the ASPUs 310 and/or modules of the DSPUs 314.

Some of the modules may include a multiplexing/demultiplexing module (e.g. frequency spreading/despreading module) 336, a frequency converter module 338, a digital compensation module 340, an equalization module 342, beamforming module 344, a compression/decompression module 348, an encryption/decryption module 350, a demodulation/modulation module 352, and interfaces. Other modules may include encoding/decoding, sampling, detection, filtering, amplification modules, and other modules for processing signals in a wide range of frequencies, for example ranging from RF to baseband frequencies. It should be appreciated that not all the modules need to be present in all embodiments, that additional modules may be present for other purposes, and that many modules may be present for one or many of the purposes described. While the disclosure describes separate modules for performing specific acts and duties, it should be appreciated that all modules have functionality for processing signals. This allows the modules to cooperate together and exchange data for optimizing the bandwidth management, among other things. The versatility of the system 300 is also evident by the fact that the modules, which are implemented by software, may be dynamically changed according to the requirements of a particular application. For example, a satellite equipped with the system 300 may receive RF signals from an endpoint, and knowing in advance the signal losses and/or distortions inherent to the endpoints' circuitry, the system 300 may reconfigure its modules to implement by software a digital compensation module 340. In some instances, if the endpoint does not provide information about the losses and/or distortions, the system 300 may reconfigure the modules to eliminate the digital compensation module 340 and use the computational resources to implement other modules.

The multiplexing/demultiplexing module 336 may apply computational techniques to the signals, such as filtering and/or switching techniques, in order to split the digital signals into up to K beams to be further processed by other modules, or to combine the digital signals in up to K beams to be subsequently transmitted by the antenna elements 308 of the system (usually after being processed by the DSPU 314 and/or ASPU 310). For example, in reception mode, the N antenna elements 308 may receive up to K antenna beams and the RF signals after being amplified, filtered and down-converted by the ASPU 310 are conveyed as intermediate frequency signals to the analog-to-digital converter 326 to be digitized, preserving any frequency and spatially multiplexed attributes. The intermediate frequency signals may be digitized as a complex representation so that each digitized intermediate frequency signal is conveyed to the multiplexing/demultiplexing module 336. The multiplexing/demultiplexing module 336 may demultiplex the digitized intermediate frequency signals into up to K complex representations of the digitized intermediate frequency signals. In transmission mode, the multiplexing/demultiplexing module 336 may perform the opposite transformation to the signals by multiplexing the K complex representations of the digitized intermediate frequency signals already processed by other modules. In some instances, the processor 330 or the central processor 302 may control the multiplexing/demultiplexing module 336 by executing firmware 334 or other programming instructions which, among other tasks, may determine the filters' parameters, the switching to a particular beam to allow more than one endpoint to use the same frequency band (spatial multiplexing), the assignment of an endpoint to a particular beam, and so forth.

The frequency converter module 338 is primarily responsible for digitally applying shifts to the frequency of the digital signals in order to transpose the signals from a determined frequency to another. In some instances, the shifts to the frequencies are digitally applied to baseband signals. This is especially useful for transposing the signals into a frequency at which it is desirable to apply a determined signal processing, for example when the received signal is transposed from RF signal into a baseband signal in order to subsequently apply phase shifts, time delays, or other beamforming parameters to the signal at the baseband frequency. In some instances, the RF signals may be shifted to a higher frequency in order to apply phase shifts, time delays, or other beamforming parameters at the carrier or an intermediate frequency. In some implementations, the frequency converter module 338 may be configured to provide control instructions to the oscillators 322 and mixers 324 at the ASPUs 310 and may also provide control instructions to other DSPUs 314 of the system. Mixers 324 may change the frequency of the input signals by software for example through the frequency converter module 338, by hardware, or a combination of both. For instance, in some implementations the local oscillator 322 may be a crystal oscillator wherein the frequency is fixed. Alternatively or additionally, instead of being determined by a fixed hardware configuration, the oscillator 322 may comprise a stable tunable local oscillator, which may be configured by software to tune to different frequencies, in order to provide more versatility to the system. The software may be for example firmware 334, executed by the processors 330 of the DSPUs 314, or may include programming instruction executed by the central processor 302.

The digital compensation module 340 is configured to apply digital compensation to the signals for compensating over analog artifacts associated with the ASPUs 310 connected to the antenna elements 308, for example to compensate for distortions and noise introduced by LNA or HPA filters. In some implementations, the digital compensation module 340 may be further configured to compensate for the signal losses and/or distortions inherent to the endpoints' circuitry and carried to the signals transmitted by the endpoints. This is useful for example when the losses and/or distortions of the analog circuitry of the endpoints are known or may be determined. For example, the filtering and distortion digital compensation module 340 may be configured to perform emphasis to the received or transmitted signal(s), including pre-emphasis or de-emphasis, or to compensate for a pre-emphasis made on the other endpoint(s). As used herein, pre-emphasis refers to the process of increasing (within a frequency band) the magnitude of some (usually higher) frequencies with respect to the magnitude of other (usually lower) frequencies in order to improve the overall signal-to-noise ratio by minimizing the adverse effects of, for example, attenuation, distortion or saturation of the signal(s) in subsequent parts of the system; and de-emphasis refers to the process of decreasing, (within a band of frequencies), the magnitude of some (usually higher) frequencies with respect to the magnitude of other (usually lower) frequencies in order to improve the overall signal-to-noise ratio by minimizing the adverse effects of, for example, attenuation distortion or saturation of the signal(s) in subsequent parts of the system.

The equalization module 342, is primarily responsible for compensating any group delay and phase delay between different frequency components of the signals by adjusting the signal parameters such as phases, gains, and so forth, of the different frequency components of the signals.

The beamforming module 344 is largely responsible for applying at least one of phase shifts, amplitude shifts, or time delays of determined magnitudes to the digitized signals in order to beamform the digitized signals to produce one or more data encoded beams associated with determined directions of propagation. For example, in reception mode the beamforming module 344 may perform multiplications on each of its complex inputs by a weighting factor usually selected in accordance with the placement of the particular antenna element 308 in the antenna array and the direction of the received antenna beam. In transmission mode, the data $D_1 \ldots D_K$ to be transmitted to one or more endpoints may be encoded either by the central processor 302 and/or any of the DSPUs 314 for example the $DSPU_M$ or some or all of the N DSPUs 314 ($DSPU_1 \ldots DSPU_N$). In some instances, the data may be encoded by converting the one or more data streams or data messages into digital baseband signals and may be conveyed through a data bus to one or more DSPUs 314, for example the $DSPU_M$, so that the encoded data streams may be divided into K digital complex baseband signals. The beamforming module 344, which in some instances may be executed by the processors 330 of the N DSPUs 314 ($DSPU_1 \ldots DSPU_N$), may multiply each of the digital complex baseband signals by a weighting factor taking into account the position of the antenna elements 308 in the array and the desired direction of the antenna beam to be transmitted by the system. Even though this example illustrates the application of beamforming parameters to baseband signals it should be understood that the beamforming parameters may be applied to signals in the intermediate frequency (IF) or VHF, UHF, S-Band, X-Band-Ka-Band, Ku-Band, or V-Bands.

The magnitude of the phase shifts, amplitude shifts, or time delays (e.g. the weighting factors) which occurs in the digital domain, may be controlled by some or all of the up to M DSPUs 314 of the system, and/or by the central processor 302 for example by setting the magnitude of the weighting factor according to a determined direction of the beam, so that the system 300 may steer the antenna beams in different directions, or by describing the movement of the other endpoint and then each of the N DSPUs 314 computes the weighing factors from the location and direction of the endpoints at a particular time. Generally, the central processor 302 may determine which endpoint (e.g. satellite) is for each K antenna beam, and some or all of the DSPUs 314 may determine the weighting factor that corresponds to each K antenna beam to be transmitted or received through the N antenna elements 308.

Other modules for implementing conventional signal processing techniques, for example the compression/decompression module 348, the encryption/decryption module 350, and the demodulation/modulation module 352, as well as alternative or additional signal processing techniques such as combination/distribution of signals, may be executed by the processors 330 of the DSPUs 314 not directly connected to the ASPUs 310 (e.g. $DSPU_M$). In some instances, a configuration determined by software may dynamically select the processors (e.g. among the processors 330 of the DSPUs 314 and/or by the central processor 302) to execute the modules and the programming instructions. Alternatively or additionally, the configuration determined by software may dynamically select the modules to be executed.

One of the main advantages of the system 300 is the possibility of reducing or distributing the processing bandwidth handled by the system while processing the signals to perform for example beamforming techniques to steer the beams in order to establish complex communication links, including the either sequential or simultaneous communication with one or more fixed or moving endpoints. Whereas in priorly known techniques beamforming is performed by injecting (feeding) a different signal to each antenna element, making it possible to shape the wavefront and steer the beam at will, this requires a full bandwidth channel per antenna element, i.e. for N antenna elements the necessary bandwidth must be multiplied by N. In contrast, in this novel configuration it is possible to send the same or different digital un-encoded and un-modulated message to several DSPUs 314, so the signal is processed at each DSPU 314 where it can be for example compensated, beamformed, multiplexed/demultiplexed, and in some instances encoded/decoded, encrypted/decrypted, compressed/decompressed, and modulated/demodulated independently, according to the communication to be established with one or more endpoints. The versatility of the system allows the algorithms executed by the processors of the DSPUs 314 to be adapted accordingly.

According to some embodiments, the software-defined communication system described in the examples herein may be part of a stationary platform, such as a ground-based station, or may be part of a movable platform, such as a ship, a car, an aircraft, a spacecraft, an unmanned aerial vehicle (UAV) or a satellite in a Low Earth orbit (LEO), Medium Earth Orbit (MEO) or Geostationary Orbit (GEO). In some implementations, a first endpoint has a software-defined communication system configured to transmit/receive antenna beams to/from one or more second endpoints, wherein each of these second endpoints may have any type of antenna with one or more receiving/transmitting elements. A second endpoint may be for example a ground station having a satellite dish antenna, a mobile-phone base station, or may be an antenna mounted on the ground or on a manned or unmanned aerial, maritime or terrestrial vehicle, such as cars, spacecrafts, satellites, drones or ships. In some instances, both the first and second endpoints may each have a software-defined communication system to establish communications between them.

Example for Use in Satellite Communications

In typical situations, after a satellite is launched on a predetermined orbit, it may need to communicate with airborne stations, base stations on the surface of the Earth, or other satellites in the same or different constellations e.g. a LEO satellite with a GEO satellite. For this reason, satellites generally comprise communication systems responsible for receiving and/or transmitting signals comprising, among other things, data such as requests for data, programming instructions, and data generated by the satellite e.g. images, the results of image analysis, scientific data, the position of the satellite, the health of the satellite or its systems, and so forth. The signals may be received by/transmitted from the ground, other satellites, or other similarly equipped devices such as manned or unmanned aerial vehicles, balloons, cars, ships, planes, and even from sensor networks. In conventional systems, an uplink/downlink transmission between a satellite and a ground station can be successfully established when the satellite passes over the ground station coverage area and both receiving and transmitting antennas are adequately positioned in order to communicate wirelessly through an unobstructed line-of-sight path at the proper direction. After the satellite passes the coverage area or when the antenna points to an inadequate direction, the uplink/downlink transmission is interrupted until the satellite passes over another ground station coverage area pointing at the proper direction. This means a limited uplink/downlink transmission determined, among other factors, by the satellite's antennas and the satellite's capacity to point the antennas to the right direction.

Figure 4A:
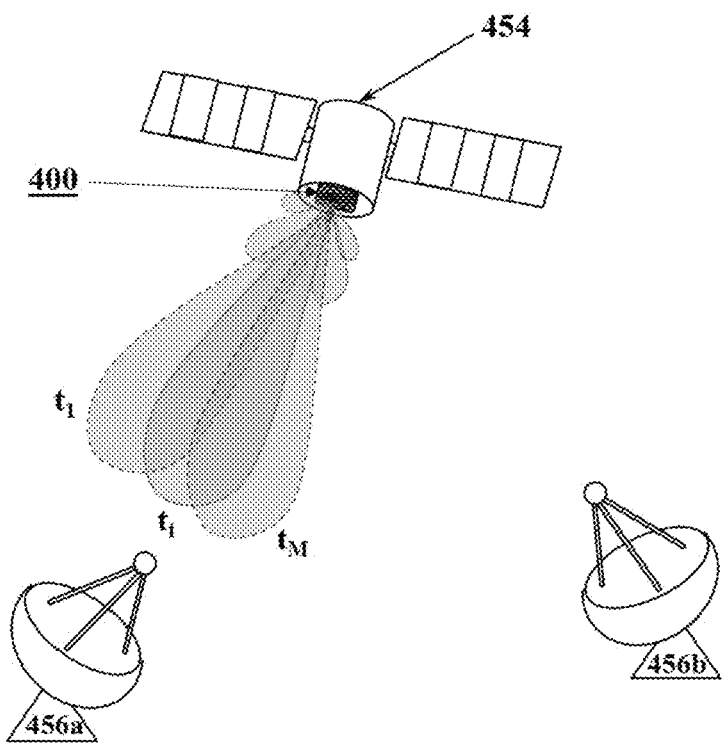
FIGS. 4A, 4B and 4C show an example of a satellite equipped with a software-defined antenna and illustrative examples of operations.
Figure 4B:
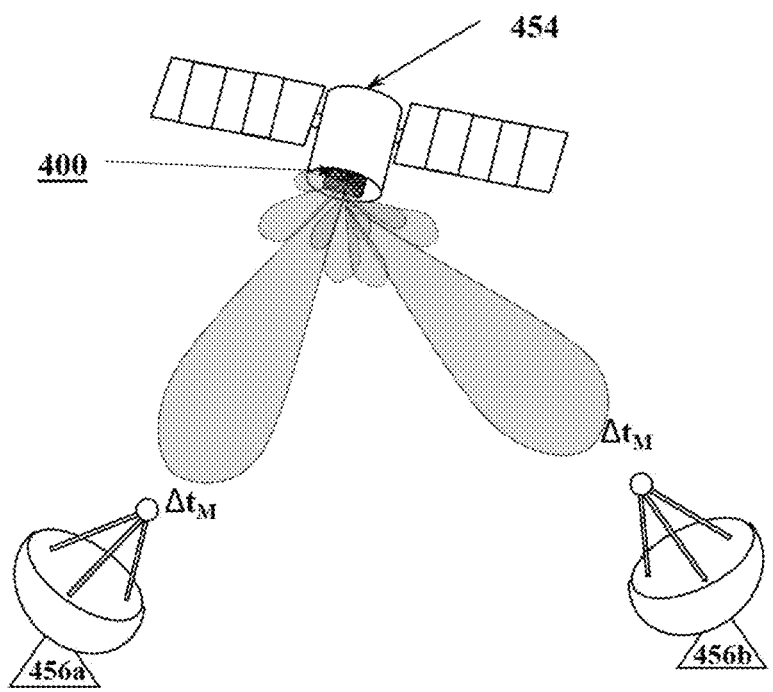

In a non-limiting example, FIGS. 4A and 4B show an example of a satellite 454 equipped with a software-defined antenna 400 comprising a plurality of antenna elements assembled in a bidimensional antenna array (however other configurations are also possible) and configured to communicate sequentially and/or simultaneously with ground stations (i.e. endpoints) distributed at fixed geographical locations, in order to optimize the uplink/downlink transmission. For example, the satellite 454 may establish a communication link with ground-based station 456a to download a certain amount of data, and given that the software-defined antenna 400 is configured to apply beamforming techniques, the antenna 400 may steer the antenna beam so that the transmission may start earlier (ti) and last longer ($t_M$) than with conventional systems, providing a wider range of area for the transmission. Before ending the transmission with the ground-based station 456a, the satellite may start transmitting data to the ground-based station 456b which is at a certain distance from the ground-based station 456a, by applying spatial multiplexing techniques, so that during a determined period of time (e.g. $\Delta t_M$), the antenna 400 may transmit simultaneously to both ground stations (endpoints) 456a and 456b, so that the transmission is not interrupted during a certain period of time and/or for a given range. These modes of operation are also useful in the event that the ground station receiving the data transmission changes its capacity to receive it or becomes unavailable for any reason (e.g. obstructions in the communication paths), the satellite 454 may transmit data to other ground stations simultaneously by spatially multiplexing the antenna beams. By operating in this manner, the ground stations may act as support or alternative endpoints in case data transmission cannot be established or is discontinued with any of the ground stations. Even though the above examples illustrate a limited number of endpoints, other numbers of endpoints can be used in the system.

Additionally, instead of a ground station, the above example may apply to the communication with other endpoints which appear to be still in relation to the satellite, such as GEO satellites with respect to LEO satellites. In other instances, the relative motion between the endpoints transmitting and receiving data is small enough to account for their relative motion. Also, the communication may be established for example between a satellite and a plurality of satellites in the same or different constellations, wherein the satellite does not need to change its attitude to communicate with the other satellites because it may steer one or more beams, or it may generate beam patterns in order to communicate with a plurality of satellites simultaneously. This property makes the satellite system resilient to the dynamic topology of the connection network in a constellation of moving satellites.

Figure 4C:
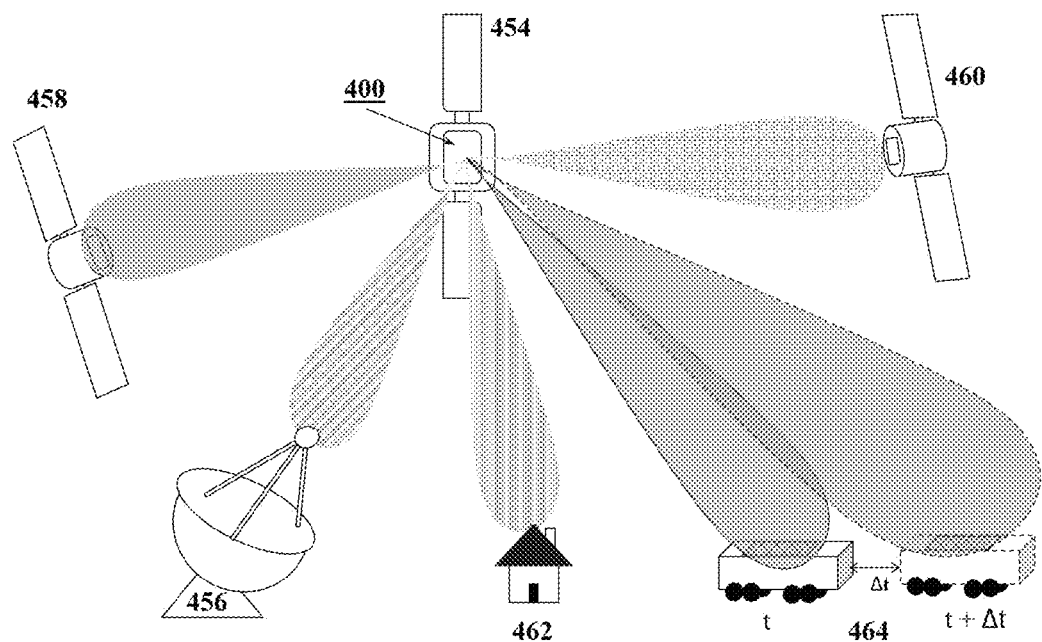

FIG. 4C illustrates another example of operation when the antenna 400 of the satellite 454 is establishing communications with multiple endpoints simultaneously and/or sequentially, performing spatial multiplexing and applying digital beamforming techniques. Amplitude control, time delays, and/or phase delays may also be applied to design the beam pattern of the communication device to obtain different configurations of main lobes and side lobes and enhance the signal in one or more directions. This may be also useful for example when the endpoint moves relative to the communication device, such as when the communication device is on a moving platform, e.g. a car, a ship or an airplane. The antenna 400 may be dynamically reconfigured by applying signal transformations at the DSPUs and/or the CP in order to adjust at least one of the number of beams, the beams' direction, the bandwidths and beam widths of each beam. For example, the satellite 454 may communicate with the ground station 456 and simultaneously with satellites 458 and 460 from the same or a different constellation, a house 462 in a fixed location, and a moving railway wagon 464. To illustrate the advantage of the operation, the satellite 454 may be broadcasting a television signal to house 462 when it passes over a geographical area and detects live events unfolding in a particular region. The satellite 454 may start capturing images and may communicate with satellites 458 and 460 to task them to capture images of that particular region without interrupting the communication with house 462. Simultaneously, the satellite 454 may also establish communication with the ground station 456 to download the captured images and may also receive from the ground station 456 information associated with the event or a task to perform, such as recording video data of the event or tracking the moving railway wagon 464 (which could be involved in the event) in order to establish a communication link without interrupting connections with the ground station 456, the satellites 458 and 460, and/or the house 462. These modes of operations which allow tailoring the radiation patterns and the direction of the beams, may be used also for simultaneously and/or sequentially broadcasting different television signals to a plurality of houses, one television signal for each house, neighborhood or city, for transmitting and/or receiving data to/from any on-board a manned or unmanned aerial vehicle such as a other satellites within a constellation of satellites, and so forth.

One of the beneficial features of this system is that communication links with multiple endpoints can be established simultaneously without the need of rotating the entire satellite. The shape and direction of the beam may be changed without moving the satellite or, if the communication device is mounted on a structure, without moving the structure to obtain a directional beam. This is also beneficial in the case of a satellite communicating with a single endpoint while passing over the endpoint, because the satellite is free to activate other payloads and change its attitude according to the requirements of other payloads such as an optical imaging system, without interfering with the communication link. For example, a satellite may transmit data to a ground station without the need of rotating the satellite because the beam is electronically directed to the ground station, but it may rotate to capture images of a region of interest while maintaining the transmission with the ground station adjusting the shape and/or direction of the beam accordingly.

In some embodiments, the software-defined communication system may further include a self-calibrating circuitry and/or software to discover the direction of the endpoints by iteratively aiming a beam in different directions and with different gains (e.g. main lobe angle and width) effectively sweeping an entire accessible angle range, covering areas of different shapes and sizes to discover one or more endpoints. Once the desired endpoints are located, spatially selective transmission beam patterns are directed to each of the endpoints.

Many advantages of the software-defined device are foreseen in implementations concerning satellite communications. The special configuration described in the embodiments provides great versatility due to the possibility of dynamically selecting the processors for processing the signal(s) with the advantage of processing the signal(s) at the DSPUs instead of being processed only at the CP, and also due to the possibility of dynamically selecting the modules to be executed by implementing different software configurations. In addition, The possibility of using a sizable array provided in the described embodiments does not interfere with the overall weight of the satellite nor produce undesirable effects.

Example Operations for Transmission/Reception of Signals

A typical communication link established to exchange information between a transmitter (Tx) and a receiver (Rx) generally comprises several signal processing/transformation steps usually implemented in separate blocks. Raw information (i.e. message or data) is processed to fit into a certain format and the intrinsic redundancy is removed. At some point some redundancy is added (synthetized) to help the communication device to recover from transmission errors and channel/medium imperfections at the receiver end. For the transmitter, the signal processing pipeline comprises some or all of the following: source (data) encoding, compression, encryption, channel encoding, multiplexing, modulation, frequency spreading, and physical means for accessing to the channel. On the other hand the receiver gets the physical signal and the signal processing pipeline includes some or all of the following: frequency despreading, demodulation and sampling, detection, demultiplexing, channel decoding, decryption, decompression and source (data) decoding. Typically Tx and Rx is a pair of nodes, making not relevant the bandwidth of information through all the blocks implementing the mentioned steps. In the devices and methods described in present description, in which communication channels may be established with many possible (multiple) endpoints, the bandwidth of information throughout the signal processing blocks becomes important. Part of the device's architecture and its low cost and technical feasibility are linked to the design choices and versatility provided by the devices and methods described herein, to reach each endpoint with the minimum necessary bandwidth and perform upscaling operations (eg: IF upconvert, FEC or redundancy adding steps) in terms of bandwidth locally i.e. at individual processing units (e.g. CP, ASPUs, DSPUs).

Although a few variations have been described in detail above, other modifications, additions, combinations and sub-combinations are possible. For example, the arrangements described for FIG. 2 may be implemented by the programmable steerable antenna system 100, the software-defined communication system 300 or the software-defined antenna 400. Any of the processes described in FIGS. 5, 6, and 7 may be implemented by the systems 100, 200, 300 or 400. The example operations exemplified in FIG. 4 and any other variation may be executed by the systems 100, 200, or 300, and so forth.

Figure 5:
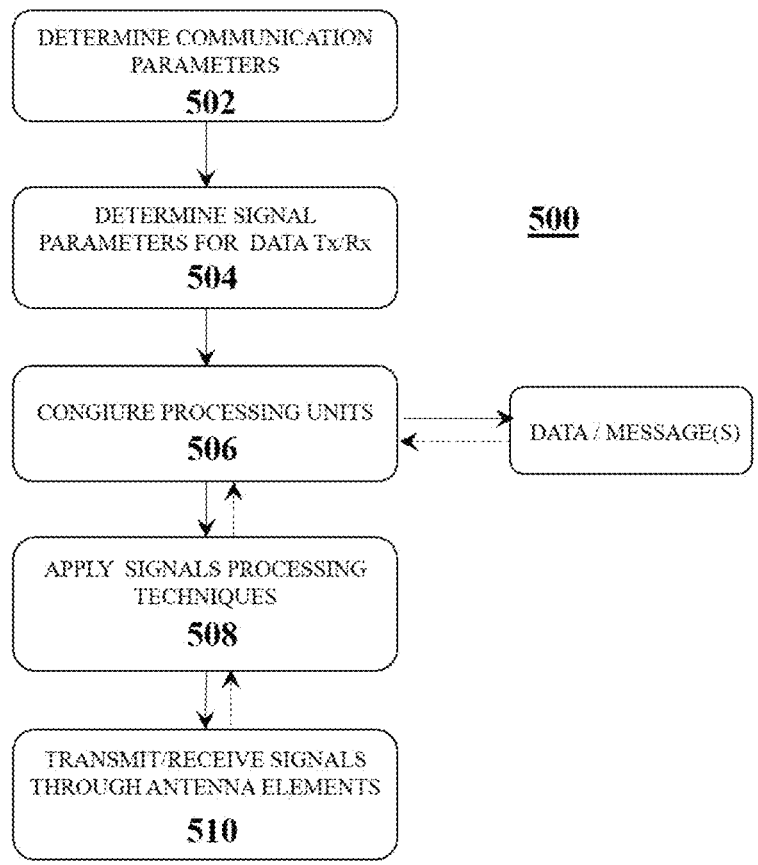
FIG. 5 is a flow diagram showing an example overview process for transmitting/receiving electromagnetic signals from a first endpoint to one or more second endpoints by dynamically reconfiguring a software-defined communication system.
Figure 6:
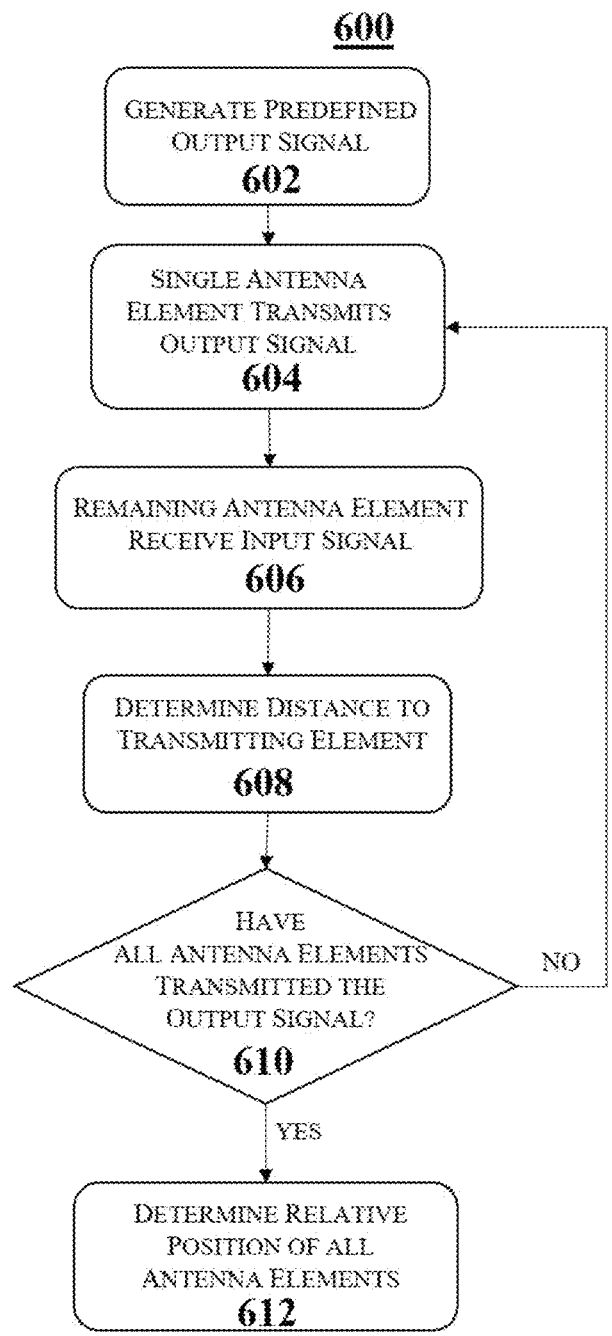
FIG. 6 is a flow diagram showing an example overview process for determining the relative position between antenna elements.
Figure 7:
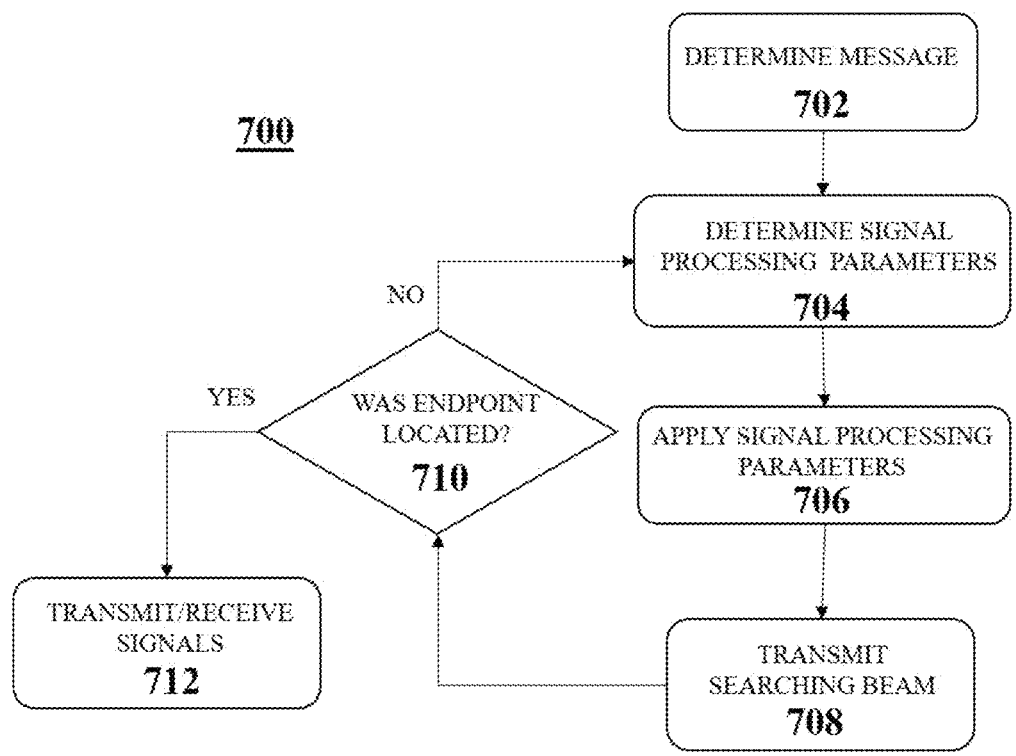
FIG. 7 is a flow diagram showing an example overview process for locating endpoints and establishing radiowave communications without knowing in advance the position, location or number of the endpoints.

FIGS. 5, 6, and 7 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in an application specific integrated circuit (ASIC), a programmable logic device, such as a field programmable gate array (FPGA), digital signal processors (DSPs), CPUs, graphical processing unit (GPU), tensor processing unit (TPU), or a software defined radio (SDR). Other examples of hardware may be used with the embodiments described herein and are contemplated herein as providing the features and benefits described. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph. Moreover, the operations may be carried out by a single system, such as onboard a terrestrial vehicle, watercraft, spacecraft, aircraft, or ground station, or may be shared between multiple systems located with the software-defined communication system and onboard one or more vehicles or ground based systems.

FIG. 5 is a flow diagram showing an example overview process 500 for transmitting/receiving electromagnetic signals from a first endpoint to one or more second endpoints by dynamically and electronically reconfiguring a software-defined communication antenna system mounted on a first endpoint to control and generate tailored beam patterns to transmit and/or receive signals to/from a plurality of second endpoints, simultaneously or not, without requiring moving elements such as a moving antenna. At 502, the communication parameters for data transmission/reception may be determined. The communication parameters may include at least one of the number, position and path of the one or more second endpoints, the data (message) to be transmitted to the endpoint(s), the distortion characteristics of the endpoint(s)' analog circuitry to be compensated by the first endpoint, and so forth. The communication parameters may be determined, for example, by any of a user, an external processor, or the components of the antenna system such as the DSPUs, the ASPUs or the CP.

At 504, signal parameters for data transmission/reception are determined. The signal parameters, such as gain, polarization, frequency, phase, distortion compensation, and so forth, may be determined based at least in part on the communication parameters, and/or the messages' (data) characteristics.

At 506, the processing units are configured, based at least in part on the signal parameters. The configuration is performed by software, allowing a versatile, dynamic and reconfigurable configuration. Given that the processing units involved in the transmission/reception operation and the steps executed by the processing units may be configured by software, alternative configurations may be applied without requiring specialized hardware for each implementation. Furthermore, the possibility of setting configurations by software according to a desired implementation without being limited by the hardware, and the means provided for selecting the processing units to be used for each implementation, optimizes the processing capabilities of the antenna system by distributing the processing demands throughout the antenna system. This step may include the selection of all or some processing units and the selection and/or determination of processing techniques to be applied by the selected processing units. The processing units may comprise the CP, some or all the DSPUs, and some or all of the ASPUs of the antenna system. For example, the CP of the antenna system may be configured to data encode/decode, compress/decompress, and encrypt/decrypt different messages, and the DSPUs connected to the ASPUs may be configured to implement algorithms at least one of channel encoding/decoding, multiplexing/demultiplexing, pulse modulation, bandpass modulation, demodulation and sampling, detection, frequency spreading/despreading, beamforming, and so forth. In some instances, the CP instead of applying processing techniques may configure some or all of the DSPUs to apply the preselected processing techniques. In some instances, the antenna system may digitally set up subarrays of antenna elements and use the subarrays to establish the communication with the subgroups of endpoints. In another example related to reception mode, some or all the DSPUs may be configured to demodulate the RF signals received by the antenna elements such that only the demodulated signals are transmitted to a central processor. The central processor may be configured to further combine the demodulated signals by some or all of the DSPUs. One of the main advantages of operating in this manner is that the bit error rate (BER) may be reduced since each DSPU may demodulate the signals with a certain amount of BER to be subsequently reduced by combining the demodulated signals at the central processor. An additional advantage which gives versatility to the system is the possibility of distributing the bandwidth of information by selecting the processing units and the signal processing techniques to be performed by the processing units.

At 508, signal processing techniques are applied to the data to be transmitted/received to/from the one or more second endpoints by the processing units configured by software at step 506. By implementing selected signal processing steps executing signal processing techniques in the digital domain, including beamforming and multiplexing techniques, the same or a different message (data) may be transmitted to each second endpoint located at different geographic locations/directions in some instances sequentially or simultaneously. For example, the antenna system may be configured to use the DSPUs connected to the ASPUs to determine a mathematical relationship between the desired radiation beam pattern e.g. the desired shape, intensity and number of lobes, and the wavefront. Since the mathematical expression of one is the Fourier transform of the other, given the desired radiation beam pattern, the wavefront may be calculated. After calculating the wavefront, the DSPUs connected to the ASPUs may calculate the relative delays of the individual antenna elements to generate the best possible estimation of the wavefront and apply for example phase shifts, amplitude shifts, or time delays to beamform the RF signals in order to generate the desired wavefront.

At 510, RF signals are transmitted/received through the antenna elements to/from one or more endpoints. For example, in transmission mode, the processed signals encoding data are transmitted forming the desired waveforms through the antenna elements and may transmit one or more messages to one or more second endpoints with an antenna beam pattern having the desired number of beams, gains, beam widths, and multiplexing attributes. In reception mode, the antenna system may be configured to direct the beam to determine directions in order to receive the waveform signals containing data from one or more second endpoints through the antenna elements to be subsequently processed by the selected processing units, according to the antenna system configuration.

In some embodiments, the software-defined communication system may be used to electronically determine the relative position of its antenna elements. Usually, the relative position between the antenna elements is known because the antenna elements are arranged in a well characterized structure, such as in a printed circuit board, and the relative position has been determined by physically measuring the distance between antenna elements or by fabrication methods. However, in some instances, it is desirable to determine the relative position between antenna elements without physically measuring the distance. FIG. 6 is a flow diagram showing an example overview process 600 for determining the relative position between antenna elements by auto-calibration methods such as by using sub-lambda knowledge through sampling using a predefined/characterized output signal (i.e. a predefined/characterized electromagnetic signal). At 602, a predefined output signal, such as a chirp is generated. The output signal may be generated by a CP or by one or more DSPUs. Once a predefined output signal is generated, at 604 the predefined output signal is transmitted by one of the antenna elements to each one of all other antenna elements of the communication system. At 608, each antenna element receives the output signal of the transmitting antenna element and from the phase or time delays, at 608, each receiving antenna element can compute a distance to the transmitting antenna element. Systematically, all elements take turns to transmit the predefined output signal, while all the remaining antenna elements receive it and compute their relative distances to the antenna element transmitting the output signal. At 610 it is determined whether each one of all antenna elements have transmitted the output signal to the remaining antenna elements. Steps 604, 606 and 608 are repeated until all antenna elements have transmitted (e.g. sequentially) the output signal to the remaining antenna elements. Finally, with all this information at 612 a complete map of the relative position of all antenna elements is computed and the relative position of all antenna elements of the software-communication system is determined, for example, using a multidimensional scaling algorithm. In some instances, each DSPU connected to each ASPU may generate and send a chirp to all the DSPUs connected to the ASPUs of the remaining antenna elements, and the DSPUs connected to the ASPUs of the remaining antenna elements after receiving the chirp may calculate their relative position to the antenna element transmitting the chirp. The relative position between antenna elements is determined electronically by the sequential transmission and reception by each of the DSPUs connected to the ASPUs of each antenna element.

FIG. 7 is a flow diagram showing an example overview process 700 which may be implemented by a phased array antenna system, such as the software-defined antenna 400 on board a first endpoint, for locating one or more second endpoints. This process is useful for example when the first endpoint does not have information in advance about the position, location and/or number of the second endpoints. In some instances, the process 700 may be used in cases when one or more of the second endpoints are mounted on moving platforms, for example when the software-defined antenna is mounted on-board the satellite 454.

At 702, one or more messages to be transmitted to one or more endpoints may be determined. In some instances, each message may be linked to a reference. For example, the software-defined antenna 400 on board a first endpoint may determine several messages ($D_1, D_2, \ldots D_N$) to be transmitted simultaneously, each to a different direction ($\varphi_1, \varphi_2, \ldots \varphi_K$), in order to search for one or more second endpoints. Alternatively, the antenna may determine several messages ($D_1, D_2, \ldots D_N$) and combine them to be transmitted in a single beam. Also, the antenna may determine a single message (e.g. $D_1$) to be transmitted simultaneously or sequentially to different directions ($\varphi_1, \varphi_2, \ldots \varphi_K$) in order to search for one or more second endpoints. N and K may be any integer number and may be the same or different e.g. one message to different directions (N=1, K>1), same number of messages and directions N=K>1, or any possible combinations. In some instances, the reference may be a position and each message may be linked to a position ($P_1, P_2, \ldots P_N$).

At 704, the signal processing parameters may be determined in order to generate one or more searching beams. For example, the processing units (e.g. the CP or the DSPUs) of the software-defined antenna 400 may encode one or more messages and determine phase shifts or time delays in order to generate one or more searching beams that may be electronically steered at particular directions or describing particular paths. The signal processing parameters may be determined to generate a searching beam comprising one or more messages and more than one lobe in order to transmit the searching beam simultaneously to different directions. Similarly, signal processing parameters may be determined to detect a searching beam in order to receive the searching beams. In some instances, several messages may be combined into a single searching beam to be transmitted sequentially into different directions, for example sweeping a particular area with the searching beam following a spiral path, a horizontal path, a vertical path, or different combinations of these. Additionally or alternatively, the system may be configured to iteratively aim a wider or narrower searching beam also sweeping the whole available angle range, for example implementing a binary search algorithm using different beam widths, or other divide and conquer search strategy, starting with a low gain wide lobe, and a simple set of communication parameters requiring low gain, and then dividing this lobe in two or four angle sections, to identify in which section is the second endpoint, and continue dividing the solid angle until achieving the required antenna gain for the desired more complex communication parameters.

At 706, the signal processing parameters previously determined to generate the searching beam may be applied to the signals in order to transmit the searching beam. For example, some or all of the processing units (e.g. DSPUs or CP) of the software-defined antenna 400 may apply the determined signal processing transformations which encoded the predetermined messages and beamformed the searching beams.

At 708, the searching beam generated with determined attributes is transmitted by the first endpoint to locate one or more second endpoints. Depending on the type and number of messages and the signal processing parameters, the searching beam may comprise one or more messages and may be transmitted as a single beam electronically steered describing particular paths or pointing at particular direction(s), or may be transmitted as multiple simultaneous beams pointing at particular directions, and in some instances may be also steered.

At 710, an endpoint may be located. For example, the software-defined antenna 400 on board the first endpoint may transmit one or more searching beams comprising lobes pointing at directions ($\varphi_1, \varphi_2, \ldots \varphi_N$) and messages ($D_1, D_2, \ldots D_N$), each message linked to a position ($P_1, P_2, \ldots P_N$). When any of the second endpoints receives a searching beam comprising one of the messages, for example the message $D_1$ linked to the position $P_1$, the second endpoint may transmit a message (receipt message) to the antenna on board the first endpoint in response to the searching beam, such that the antenna, after receiving the receipt message from the second endpoint, may determine what message the second endpoint received and hence the position ($P_1$) of the second endpoint. Alternatively, if no endpoint is located, signal processing parameters different from the previous ones may be determined in order to generate different searching beams or alternative sweeping trajectories or strategies to steer the beam and continue searching for one or more endpoints until an endpoint is located. Once an endpoint is located, a communication link may be established and, at 712, RF signals may be transmitted and/or received between the first endpoint and the found one or more second endpoints.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B:", "one or more of A and B:", and "A and/or B" are each intended to mean "A alone, B alone, or A and B together." A similar interpretation is also intended for lists including three or more items. For example, the phrases "at least one of A, B, and C:", "one or more of A, B, and C:" and "A, B, and/or C" are each intended to mean "A alone, B alone, C alone, A and B together, A and C together, B and C together, or A and B and C together." In addition, use of the term "based on" above and in the claims is intended to mean "based at least in part on", such that an unrecited feature or element is also permissible.

CONCLUSION

The subject matter described herein can be embodied in systems, apparatus, methods, and/or articles depending on the desired configuration. Although the disclosure uses language that is specific to structural features and/or methodological acts, the invention is not limited to the specific features or acts described. Rather, the specific features and acts are disclosed as illustrative forms of implementing the subject matter described herein. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A software-defined communication device comprising:
a plurality of antenna elements;
a plurality of analog signal processing units (ASPUs) configured to connect via antenna channels to the plurality of antenna elements; and
a plurality of digital signal processing units (DSPUs) configured to connect to at least one of the plurality of ASPUs and/or to one or more of remaining DSPUs of the plurality of DSPUs;
wherein the plurality of DSPUs is configured to operate in transmission mode and/or reception mode, wherein each of at least two DSPUs operating in the same mode is configured to connect to at least one of the plurality of ASPUs; and
wherein the device is further configured to:
dynamically select, based at least in part on one or more signal parameters, the at least two DSPUs among the plurality of DSPUs for processing an electromagnetic signal or to dynamically select programming instructions to be executed by the at least two DSPUs among the plurality of DSPUs; and
apply signal processing techniques to the electromagnetic signal, wherein the signal processing techniques are determined based at least in part on the one or more signal parameters, the one or more signal parameters being determined based at least in part on communications parameters.

2. The device according to claim 1, wherein each of the plurality of ASPUs comprises hardware and is configured to process analog signals transmitted and/or received by the plurality of antenna elements; and each of the plurality of DSPUs comprises a processor, a memory and programming instructions stored on the memory and executable by the processor to perform acts including:
applying digital signal processing techniques to digital signals obtained from converting the received analog signals or obtained before being converted to the analog signals to be transmitted;
wherein applying the digital signal processing techniques comprises applying at least one of phase shifts, amplitude shifts or time delays of selective magnitudes to the digital signals to beamform the digital signals to produce one or more antenna beams associated with respective directions of propagation.

3. The device according to claim 2, wherein the digital signal processing techniques further comprise at least one of data or channel encoding/decoding, multiplexing/demultiplexing, compression/decompression, encryption/decryption, sampling, detection, frequency spread/despread, filtering, amplification, up/down conversion, demodulation/modulation, phase shifting, time delaying, equalization, distortion, and distortion compensation.

4. The device according to claim 2, wherein the at least one of phase shifts, amplitude shifts or time delays of selective magnitudes are applied to baseband signals.

5. The device according to claim 2, wherein at least one of the plurality of DSPUs is further configured to at least one of adjusting at least one of a gain, power, coverage angle, coverage distance or intensity of the antenna beams; detecting or synthesizing signal polarization; and compensating for transmission losses and/or distortions, on reception and/or transmission of signals.

6. The device according to claim 1, further comprising antenna element subarrays, wherein the antenna element subarrays are determined by programming instructions defining subsets of antenna elements, and/or by physically coupling or connecting together a predetermined number of DSPUs.

7. The device according to claim 1, wherein at least one of the plurality of DSPUs is further configured to electronically establish antenna element subarrays to steer one or more antenna beams in different directions, and/or to electronically generate tailored constructive and/or destructive antenna beam patterns.

8. The device according to claim 1, wherein at least one of the plurality of DSPUs is further configured to transpose a signal from a baseband or intermediate frequency into a higher frequency, or vice versa.

9. The device according to claim 1, wherein the plurality of antenna elements are distributed arbitrarily over a bidimensional surface or a three-dimensional space, with or without following a regular or apparent pattern.

10. The device according to claim 1, wherein the plurality of antenna elements are mounted on at least one of a manned or unmanned physical structure, terrestrial vehicle, maritime vehicle, space vehicle or aerial vehicle.

11. The device according to claim 1, configured to determine the relative position between the plurality of antenna elements, wherein:
at least one DSPU of the plurality of DSPUs is configured to generate a predefined electromagnetic signal;

each of the plurality of antenna elements is configured to transmit the predefined electromagnetic signal sequentially to each other antenna element of the plurality of antenna elements; and the same or a different at least one DSPU of the plurality of DSPUs is configured to determine, based on the predefined electromagnetic signal received by each other antenna element, a distance to each other antenna element transmitting the predefined electromagnetic signal.

12. The device according to claim 1, wherein the dynamic selection of the DSPUs or programming instructions is based at least in part on at least one of an application, processing bandwidth, or communication requirements.

13. A method for transmitting/receiving an electromagnetic signal from a first endpoint to one or more second endpoints, the method comprising:
  determining, based at least in part on communication parameters, one or more signal parameters for data transmission/reception;
  determining, based at least in part on the one or more signal parameters, one or more signal processing techniques to be applied to the electromagnetic signal by one or more processing units;
  selecting, based at least in part on the one or more signal parameters, two or more processing units;
  applying, before transmission and after reception, the signal processing techniques to the electromagnetic signal by the one or more processing units; and
  transmitting the processed electromagnetic signal through one or more antenna elements, by sending the processed electromagnetic signal from each of the two or more processing units to at least one analog signal processing unit (ASPU) connected to at least one of the one or more antenna elements, or receiving the electromagnetic signal through the one or more antenna elements by sending the electromagnetic signal from each of at least two analog signal processing units (ASPUs) each connected to at least one of the one or more antenna elements, to each of the two or more processing units.

14. The method according to claim 13, wherein the signal parameters are determined at least in part by communication parameters, the communication parameters including at least one of a number of second endpoints, a position of second endpoints, a path of second endpoints, or a distortion to be compensated.

15. The method according to claim 13, wherein the signal processing techniques include implementing algorithms for at least one of data or channel encoding/decoding, multiplexing/demultiplexing, compression/decompression, encryption/decryption, sampling, detection, frequency spread/despread, filtering, amplification, up/down conversion, demodulation/modulation, phase shifting, time delaying, equalization, distortion, or distortion compensation.

16. The method according to claim 13, further comprising the step of transposing the electromagnetic signal from a baseband or intermediate frequency into a higher frequency, or from a higher frequency into a baseband or intermediate frequency.

17. The method according to claim 13, wherein the one or more signal parameters are determined to generate a searching beam comprising one or more messages and more than one lobe in order to transmit the searching beam simultaneously to different directions.

18. The method according to claim 17, wherein the searching beam is transmitted sequentially to different directions sweeping a particular area and/or iteratively aiming a wider or narrower searching beam.

19. A software-defined communication device comprising:
  a plurality of antenna elements;
  a plurality of analog signal processing units (ASPUs) configured to connect via antenna channels to the plurality of antenna elements; and
  a plurality of digital signal processing units (DSPUs) configured to connect to at least one of the plurality of ASPUs and/or to one or more of remaining DSPUs of the plurality of DSPUs;
  wherein the software-defined communication device is configured to perform the method steps of claim 13.

20. A method for determining the relative position between antenna elements of a software-defined communication system, the method comprising the steps of:
  a. generating a predefined electromagnetic signal;
  b. transmitting, by a first antenna element of the antenna elements of the software-defined communication system, the predefined electromagnetic signal sequentially to each other antenna element of the software-defined communication system;
  C. determining, by a second antenna element of the antenna elements of the software-defined communication system, and based on the predefined electromagnetic signal received by the second antenna element, a distance to the first antenna element transmitting the predefined electromagnetic signal; and
  d. repeating steps b and c until all antenna elements have transmitted the predefined electromagnetic signal, to determine the distances between the antenna elements.

21. The method according to claim 20, further comprising the step of determining, based on the distances, a map of the relative position of all the antenna elements.

22. The method according to claim 20, wherein the predefined electromagnetic signal is a chirp or a pulse.

* * * * *